United States Patent
Kakadia et al.

(10) Patent No.: US 9,088,612 B2
(45) Date of Patent: Jul. 21, 2015

(54) SYSTEMS AND METHODS FOR PROVIDING LINK-PERFORMANCE INFORMATION IN SOCKET-BASED COMMUNICATION DEVICES

(71) Applicants: Verizon Patent and Licensing Inc., Basking Ridge, NJ (US); Cellco Partnership, Basking Ridge, NJ (US)

(72) Inventors: Deepak Kakadia, Union City, CA (US); Mingxing S. Li, San Jose, CA (US); Lalit R. Kotecha, San Ramon, CA (US); Donna L. Polehn, Kirkland, WA (US); Priscilla Lau, Fremont, CA (US); Patricia R. Chang, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 187 days.

(21) Appl. No.: 13/765,660

(22) Filed: Feb. 12, 2013

(65) Prior Publication Data

US 2014/0226658 A1 Aug. 14, 2014

(51) Int. Cl.
*H04L 12/28* (2006.01)
*H04L 29/06* (2006.01)
*H04L 12/26* (2006.01)
*H04L 12/801* (2013.01)
*H04L 12/851* (2013.01)
*H04L 29/08* (2006.01)
*G06F 11/30* (2006.01)
*H04W 40/12* (2009.01)
*H04L 12/24* (2006.01)

(52) U.S. Cl.
CPC .......... *H04L 69/162* (2013.01); *H04L 43/0876* (2013.01); *H04L 43/0882* (2013.01); *H04L 47/10* (2013.01); *H04L 69/16* (2013.01); *G06F 11/30* (2013.01); *H04L 41/046* (2013.01); *H04L 43/08* (2013.01); *H04L 43/087* (2013.01); *H04L 43/0829* (2013.01); *H04L 43/0864* (2013.01); *H04L 47/2408* (2013.01); *H04L 69/32* (2013.01); *H04W 40/12* (2013.01)

(58) Field of Classification Search
None
See application file for complete search history.

(56) References Cited

U.S. PATENT DOCUMENTS

| | | | | |
|---|---|---|---|---|
| 5,619,650 A | * | 4/1997 | Bach et al. | 709/246 |
| 5,825,890 A | * | 10/1998 | Elgamal et al. | 713/151 |
| 6,799,077 B1 | * | 9/2004 | Hauet | 700/2 |
| 7,024,479 B2 | * | 4/2006 | Shah et al. | 709/227 |
| 7,266,192 B2 | * | 9/2007 | Statham et al. | 379/265.02 |

(Continued)

*Primary Examiner* — Bunjob Jaroenchonwanit (57) ABSTRACT

A network socket application programming interface (API) running on a communication device is operative to provide, to applications running on the device, information about the performance of communication links used by sockets for communicating across a network. The socket API receives packets associated with sockets, and retrieves from the packets performance information for corresponding communication links. In response to receiving a request from an application for performance information associated with a particular socket, the API identifies performance information for the particular socket and returns the retrieved information to the application. A performance monitoring network device provides the performance information. The performance monitoring device stores information about the performance of a plurality of communication links used by sockets of communications devices in the network, and inserts the performance information for particular sockets into associated packets before transmitting the packets to corresponding communication devices.

25 Claims, 6 Drawing Sheets

(56) References Cited

U.S. PATENT DOCUMENTS

| | | | |
|---|---|---|---|
| 7,380,021 B2* | 5/2008 | Boden | 709/245 |
| 7,533,176 B2* | 5/2009 | Freimuth et al. | 709/227 |
| 7,552,441 B2* | 6/2009 | Lim et al. | 719/312 |
| 7,860,999 B1* | 12/2010 | Subramanian et al. | 709/238 |
| 7,895,270 B2* | 2/2011 | Rao et al. | 709/205 |
| 8,521,868 B2* | 8/2013 | Ben-Yehuda et al. | 709/224 |
| 2002/0080802 A1* | 6/2002 | Sachs et al. | 370/401 |
| 2002/0199019 A1* | 12/2002 | Battin et al. | 709/245 |
| 2003/0018796 A1* | 1/2003 | Chou et al. | 709/231 |
| 2003/0182446 A1* | 9/2003 | Koide et al. | 709/238 |
| 2004/0034860 A1* | 2/2004 | Fernando et al. | 719/315 |
| 2004/0141501 A1* | 7/2004 | Adams et al. | 370/389 |
| 2004/0213224 A1* | 10/2004 | Goudreau | 370/389 |
| 2005/0022045 A1* | 1/2005 | Fenart et al. | 714/4 |
| 2006/0031527 A1* | 2/2006 | Soles et al. | 709/227 |
| 2006/0126504 A1* | 6/2006 | Meier et al. | 370/229 |
| 2007/0280245 A1* | 12/2007 | Rosberg | 370/392 |
| 2008/0056178 A1* | 3/2008 | Alexander et al. | 370/328 |
| 2008/0086562 A1* | 4/2008 | Etoh et al. | 709/224 |
| 2008/0104575 A1* | 5/2008 | Fan et al. | 717/124 |
| 2008/0244085 A1* | 10/2008 | Li et al. | 709/237 |
| 2008/0301320 A1* | 12/2008 | Morris | 709/238 |
| 2009/0089440 A1* | 4/2009 | Gathman | 709/228 |
| 2009/0109866 A1* | 4/2009 | Kim et al. | 370/252 |
| 2009/0201944 A1* | 8/2009 | Aoki et al. | 370/466 |
| 2009/0274045 A1* | 11/2009 | Meier et al. | 370/235 |
| 2010/0023626 A1* | 1/2010 | Hussain et al. | 709/227 |
| 2010/0070651 A1* | 3/2010 | Morikawa | 709/247 |
| 2011/0019551 A1* | 1/2011 | Adams et al. | 370/235 |
| 2011/0158099 A1* | 6/2011 | Fujita | 370/235 |
| 2011/0305435 A1* | 12/2011 | Tanaka et al. | 386/259 |
| 2012/0108250 A1* | 5/2012 | Ahn et al. | 455/450 |
| 2013/0061078 A1* | 3/2013 | Cullimore | 713/323 |
| 2013/0100810 A1* | 4/2013 | Slothouber | 370/235 |
| 2013/0111038 A1* | 5/2013 | Girard | 709/226 |
| 2013/0124738 A1* | 5/2013 | Lynch et al. | 709/227 |
| 2013/0191537 A1* | 7/2013 | Ivanov et al. | 709/224 |
| 2013/0231151 A1* | 9/2013 | Kneckt et al. | 455/515 |
| 2013/0258867 A1* | 10/2013 | Wanstedt et al. | 370/241 |
| 2014/0223418 A1* | 8/2014 | Michelsen et al. | 717/135 |
| 2014/0304407 A1* | 10/2014 | Moon | 709/224 |

* cited by examiner

SYSTEMS AND METHODS FOR PROVIDING LINK-PERFORMANCE INFORMATION IN SOCKET-BASED COMMUNICATION DEVICES

BACKGROUND

In recent years, network communication services have expanded and increased in popularity around the world. Many advanced networks offer wired and wireless communication services for data communications, voice calls, and messaging services. The data communication services enable users of communication devices to surf the world wide web via web browsers, for example, as well as enable applications running on the communication devices to connect to remote network devices or servers to upload or download content and information.

Network communication sockets provide a convenient means for applications on one communication device to communicate across a network with applications running on other communication devices, such as other network-connected user equipment devices and servers. The network communication sockets on the various communication devices are managed by network socket application programming interfaces (API) running on each device. In order to communicate with an application on a remote device, an application running on one device sends to the network socket API running on the one device a message identifying a particular network socket. The local network socket API manages a communication link to the remote device that is associated with the particular socket, and ensures that the message is transmitted across the communication link to the application on the remote device. The network communication sockets thus provide a level of network-abstraction that enables applications on the various devices to communicate with each other across the network without requiring the applications themselves to manage the cross-network communication links used by the sockets.

The network communication sockets, however, provide little or no information about the communication links used by the sockets and socket APIs for communication across the network. Thus, applications using communication sockets for communication generally do not have access to information regarding the particular type(s) of communication links used by sockets, the network bandwidth available through the communication links, or the jitter, delay, or other performance parameters of the communication links. Hence, a need exists for systems and methods for providing applications using network communication sockets for communication with information about the communication links and the performance of the communication links used by the sockets for communication across the network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to providing an application, running on a communication device and using a network socket for communication, with information about a network communication link across which the socket is connected. The systems and methods further relate to a performance monitoring network device configured to assemble information about network communication links across which communication device sockets are connected, and to provide each communication device with the assembled information relating to sockets on the device.

In response to receiving a request to establish a connection through a socket from an application running on the communication device, a network socket application programming interface (API) running on a communication device establishes a communication link with another communication device across the communication network. The network socket API receives, across the established communication link, a packet associated with the socket and including information about the performance of the communication link. The network socket API stores, in a memory of the communication device, the received information about the performance of the communication link. In response to receiving a request from the application, for information about the performance of the communication link, the network socket API retrieves and returns to the application the stored information about the performance of the communication link.

In a first example, the received packet associated with the socket is a data packet having a header (e.g., a TCP or UDP packet), wherein the header of the packet includes the information about the performance of the communication link. In the first example, the received packet may be a packet carrying application data or other application-related communications between devices on the network, and the packet may include an identifier for the associated socket which identifies the associated socket as a destination to which the packet is being transmitted. In a second example, the packet associated with the socket is a control packet (e.g., an Internet control message protocol (ICMP) packet), wherein the packet includes the information about the performance of the communication link. The control packet may be any packet transmitted through the network that carries control information between devices in the network, including packets that do not carry data or communications that are destined for applications running on communication devices in the network. In the second example, the method may further include steps for, in response to receiving the request from the application running on the communication device for information about the performance of the communication link, generating and transmitting across the network a control packet requesting the information about the performance of the communication link and identifying the socket associated with the communication link, wherein the received packet associated with the socket is received in response to the control packet requesting the information.

A communication link may refer to a set of one or more connections providing a communication path through a network between two communication devices serving as source/destination end points for the communication path. The set of one or more connections may include a single connection, for example in the case of one communication device connecting directly to another communication device through a wired or wireless link. More generally, however, the set of one or more connections includes multiple connections used to route communications between first and second communications devices, such as a first wireless connection connecting the first communication device to a first base station, one or more wired connections connecting the first base station to a second base station, and a second wireless connection connecting the second base station to a second communication device.

The information about the performance of the communication link can include information about type(s) of wireless connection(s) over which the communication link is established (e.g., Wifi, 3G LTE, . . . ), information about network bandwidth (or network speed), network congestion and back-log (e.g., length/occupancy of sending queues), or jitter, delay, packet loss, or link quality on the established communication link, or the like.

The communication device may be a user equipment device (e.g., mobile wireless communication device, such as a mobile/cellular telephone or a smartphone, a personal computer equipped for mobile wireless communication using an air card, or the like) or a server configured to use sockets for communication across a communication network.

The information about the performance of the communication link may be provided by a performance monitoring network device (or performance monitor) connected to the network and optionally located in-line with the communication link. The network device stores in a high speed memory (e.g., SRAM, RDL-RAM) socket-related information about the performance of communication links used by a plurality of communication devices for socket-based communication through the network. In the first example, in response to receiving a packet (e.g., TCP or UDP packet) that is associated with a socket of a communication device, the performance monitoring network device inserts into the header of the received packet the information about the performance of the communication link associated with the socket, and forwards the packet including the inserted information to the packet's destination. In the second example, in response to receiving from a communication device a control packet (e.g., an ICMP packet) requesting information about the performance of a communication link associated with a socket, the performance monitoring network device generates and transmits to the communication device a response control packet including the information about the performance of the communication link associated with the socket.

The performance monitoring network device receives information about the performance of a communication link from network relay devices located along the communication link in the network. The network relay devices may include one or more of a router, switch, gateway, eNodeB device, SGW, PGW, or the like. The information about the performance of the communication link can include information about type(s) of wireless connection(s) over which the communication link is established (e.g., Wifi, 3G LTE, . . . ), information about network bandwidth (or network speed), network congestion and back-log (e.g., length/occupancy of sending queues), or jitter, delay, packet loss, or link quality on the established communication link, or the like.

Reference now is made in detail to the examples illustrated in the accompanying drawings and discussed below.

Figure 1A:
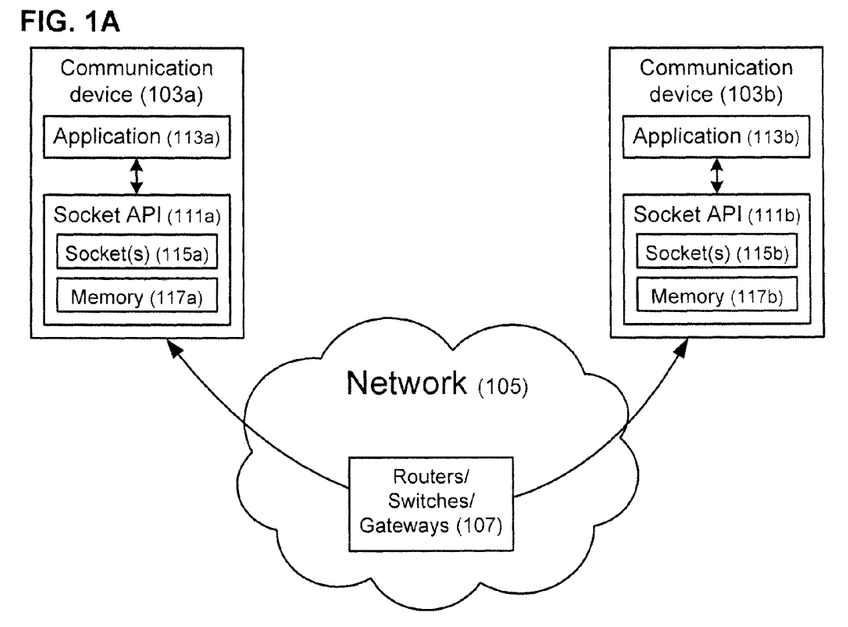
FIG. 1A is a network diagram illustratively showing two communication devices operative to communicate with each other across a network using network communication sockets.

FIG. 1A is a network diagram illustratively showing two communication devices 103a and 103b operative to communicate with each other across a network 105. Each communication device 103a/103b includes a respective socket application programming interface (API) 111a/111b running thereon and operative to provide one or more applications 113a/113b, running on the respective device, with network communication sockets 115a/115b for use in communicating across the network. A socket 115a/115b can be used to communicate with a remote device, and with one or more applications running on the remote device. Communications using the sockets 115a/115b are routed by the socket APIs 111a/111b between remote devices across the network 105 through one or more routers, switches, and/or gateways 107 of the network 105.

In one example, an application 113a running on communication device 103a sends a request to socket API 111a to open a socket 115a for communication with an application 113b running on communication device 103b. In response to the request, the socket API 111a sends a connection request through the network 105 to the socket API 111b of device 103b to establish a connection through the network 105. Once the connection is established, applications 113a and 113b on devices 103 and 103b can communicate with each other across the network 105 using the sockets 115a/115b established by respective socket API 111a/111b on the respective device 103a/103b. The connection travels across a communication link, established between the devices 103a and 103b and across the network 105 that is associated with the respective socket on each device.

In the one example, the socket API 111a on a communication device 103a stores, for each socket 115a on the device 103a, an entry associating the socket with an application running on the communication device and having opened the socket. A device and socket API can manage multiple sockets concurrently, and each socket is uniquely identified in the device or API by a number (e.g., a port number, such as port 7), by a combination of number and protocol (e.g., TCP port 7), or another appropriate identifier. Upon receiving a packet in the communication device 103a that identifies a socket, the socket API 111a retrieves the entry associated with the socket identified in the packet and forwards the packet to the application 113a identified in the entry. Additionally, in response to receiving a request from an application 113a to establish a connection with a socket 115b or an application 113b on a remote device 103b through the socket 115a, the socket API 111a establishes a communication link or connection with the remote device 103b and stores, in the entry associated with the socket 115a, an address for the remote device 103b and an identifier for the paired socket 115b on the remote device 103b. In turn, upon receiving a packet from the application 113a for transmission through the socket 115a, the socket API 111a retrieves the entry associated with the socket, inserts into the packet an identifier for the paired socket 115b identified in the entry, and forwards the packet through the established communication link to the device 103b identified in entry. A socket on a particular communication device is thus generally associated with a single application on the particular communication device and, once a connection is established through the socket, with a single remote device and with a single application or socket on the remote device.

Each socket API 111a/111b can further include a memory 117a/117b for storing performance information relating to the performance of the communication links associated with the corresponding socket(s) 115a/115b. The link performance information is described in more detail below. While shown in FIG. 1A as being located within the socket APIs 111a/111b, the memories 117a/117b can more generally be located in the corresponding communication device 103a/103b.

The network 105 may be formed of one or more wired or wireless networks, such as one or more mobile wireless networks. Wi-Fi networks, radio access networks (RANs), private or public local area (LAN) or wide area (WAN) networks, the Internet, or other packet-based network(s). The various networks forming part of network 105 are interconnected by (and can each include) routers, switches, and/or gateways (referenced generally as 107), such that communications through network 105 can be routed through the various networks and routers/switches/gateways between a source communication device and a destination communication device. The networks forming part of network 105 may conform to one or more of the CDMA standard, the 3GPP standard, the EVDO standard, the GSM standard, the TDMA standard, or the like. A socket is associated with an end-to-end communication link through the network between the socket's own communication device and a remote device associated with the socket, whether that communication link extends across multiple different connections or links through the network 105.

Each communication device 103a/103b can be a user equipment device, such as a personal, laptop, or tablet computer (including devices equipped with mobile broadband modems, air cards, or other interfaces for communication across mobile wireless networks), a personal data assistant (PDA), a mobile/cellular phone, smart-phone, or other mobile wireless device, or the like. A communication device 103a/103b can also be a server device, such as a data center server, a web server, or any other device functioning as a server with respect to other communication devices 103a/103b functioning as clients.

Figure 1B:
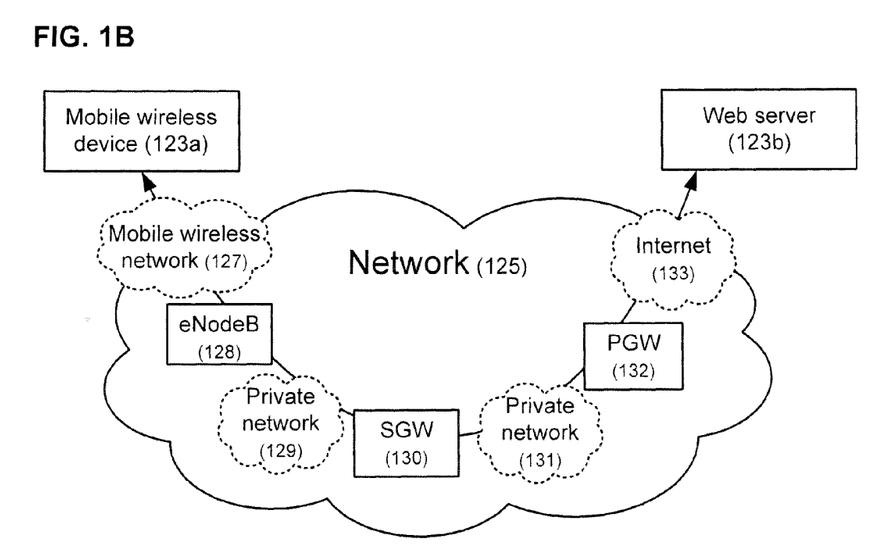
FIG. 1B is a network diagram illustratively showing a mobile wireless device and a web server operative to communicate with each other across a network using network communication sockets.

FIG. 1B is a network diagram showing a particular example of a network linking two communication devices 123a and 123b. In the example shown in FIG. 1B, communication device 123a is a mobile wireless device, while communication device 123b is a web server. A client application running on communication device 123a establishes a socket-based connection with a server application running on communication device 123b across a communication link running through network 125. In the example, the communication link is routed between the communication devices 123a and 123b through a mobile wireless communication network 127, an eNodeB 128 or other mobile wireless base station, one or more private networks 129 and 131, a serving gateway (SGW) 130, a packet data network (PDN) gateway (PGW) 132, and the Internet 133 or other public packet-switched network. The communication link can additionally or alternatively be routed through one or more antennas, base stations and base transceiver systems, or other such components. Data and other information exchanged between applications running on communication devices 123a and 123b using the sockets are communicated between the devices using packets transmitted by and received by the devices. A packet may thus carry data or information associated with a particular socket on each device, and may propagate through network 125 along the communication link associated with the sockets. The packets generally also include identifiers for the sockets and for the source and destination devices 123a/123b between which the packet is to travel.

Figure 2:
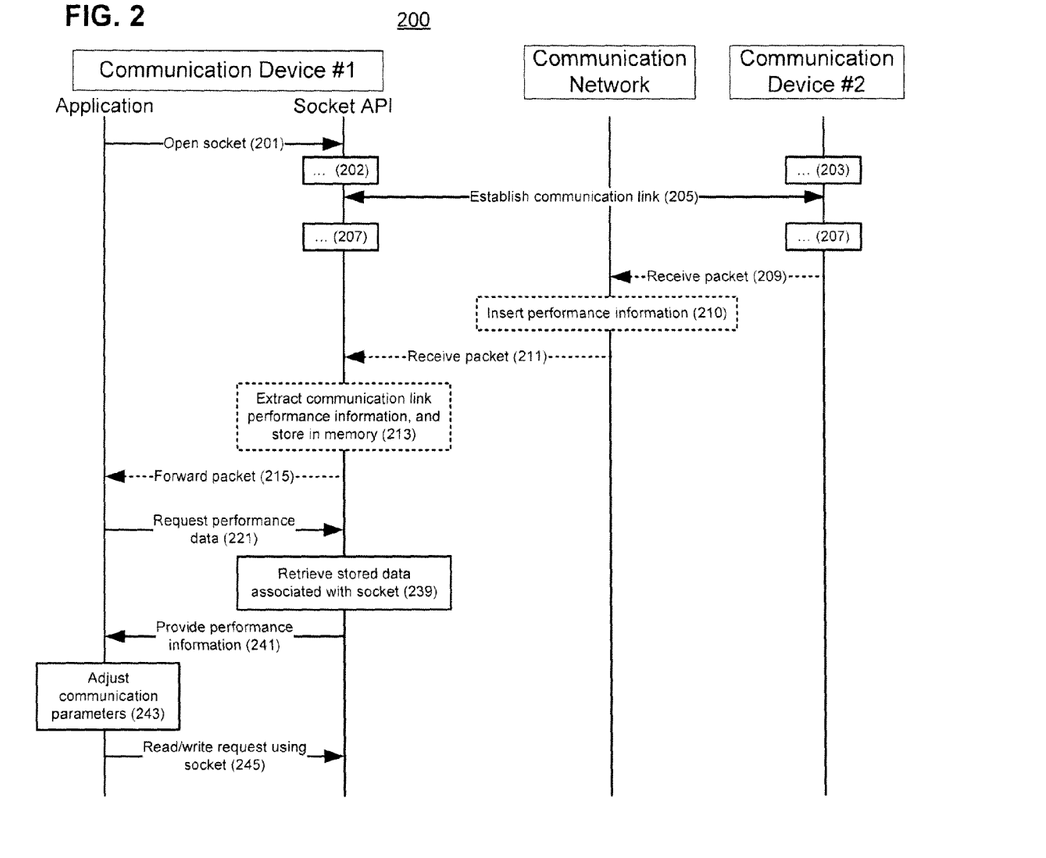
FIGS. 2 and 3 are signal flow diagrams illustratively showing communications involved in a socket API on a first communication device obtaining and providing information about the performance of a communication link established through a socket with a second communication device.

FIG. 2 is a signal flow diagram illustratively showing communications involved in a socket API on a first communication device obtaining and providing information about the performance of a communication link established through a socket with a second communication device.

The method 200 begins at step 201 with an application running on the first communication device sending a request to the socket API to open a communication socket. In response to receiving the request, the socket API may create the new socket, and allocate system resources to the socket. If the application is a server application (or the first communication device is a server device), the socket API may additionally bind the socket, and place the socket in a listening state (step 202) to listen for connection requests from client devices. If the application is a client application (or the first communication device is a client device), the socket API may wait to receive a connection command from the application (step 202). Similar operations may be performed on a remote communication device located across the communication network (e.g., the second communication device) in step 203, whereby a complementary client or server socket is opened on the second device for communication with the opened socket of the first device.

In response to receiving and accepting a connection request to the socket from a second communication device (in the case of a server application running on the first communication device), a communication link is established through the communication network in step 205 between the opened socket of the first communication device and a corresponding socket of the second communication device. Alternatively, in response to receiving a request from the application (in the case of a client application running on the first communication device) to establish a connection through the opened socket, to sending a connection request to the second communication device, and to having the connection request accepted, a communication connection and link is established through the communication network in step 205 between the opened socket of the first communication device and the corresponding socket of the second communication device. Once the link is established, applications running on the first and second communication devices may send and receive communications and data between each other across the established communication link using the sockets on the respective communication device (step 207).

The communication connection or link may be a link conforming to the transmission control protocol (TCP), the user datagram protocol (UDP), or the like. Alternatively, various portions of the communication link may conform to different transmission protocols, including the TCP, UDP, and/or other protocols. The communication link is operative to link the socket on the first communication device with a complementary socket on the second communication device through the communication network. As such, the communication link travels through various components (e.g., routers, switches, and gateways) of the communication network between the first and second communication devices.

Once the socket is created (e.g., in the case of UDP), or once a connection is established using the socket (e.g., in the case of TCP), the socket API begins to receive packets associated with the socket across the communication network (step 211). In general, a packet is associated with a socket if the packet includes an identifier for the socket, for example by identifying the socket as a destination socket for the packet. Some or all of the received packets can include information about the performance of the communication link associated with the socket, and the socket API may extract the communication link performance information from the packet (step 213) upon receipt of the packet and prior to forwarding the packet to the application associated with the socket (step 215). The extracted information is stored in a memory of the first communication device in association with an identifier for the socket (or the communication link) associated with the packet the information was extracted from. The packet forwarded to the application generally corresponds to the packet received by the socket API and has the communication link performance information removed, though in some examples the performance information remains in the forwarded packet.

The packets received in step 211 generally are data packets (such as packets conforming to the TCP or UDP protocol) which were transmitted by the second communication device (step 209) through the communication network to the first communication device. The data packets generally are packets communicated between applications on the first and second communication devices and carrying application data or other communications exchanged between the applications. In general, the communication link performance information is included in a header of the packet (e.g., in an options field of the TCP or UDP header, in another fixed-length field of a header, or the like). The performance information is inserted (step 210) into the header by one or more relay devices of the communication network that are located in-line with the communication link (i.e., devices of the communication network through which the packet flows as it is transmitted from the second communication device through the network to the first communication device). The in-line relay devices can be any of a router, a switch, a gateway, a performance monitoring network device, or the like such as those shown in FIG. 1B. However, in some situations, the information can also be inserted into the header by the source communication device (i.e., the second communication device). The insertion of the performance information is described in further detail below, notably in relation to FIG. 5.

In an alternate example, the communication link performance information is included in a body of the data packet (such as a TCP or UDP packet), or in the body of a control packet (such as an ICMP packet). In situations in which the performance information is included in the body of a packet, the packet is generally received from a network device of the communication network through which the communication link is established (i.e., an in-line device) or from the second communication device.

However, the packet may more generally be received from a performance monitoring network device that is, or is not, located in-line with the communication link. Both in situations in which the performance information is received in a header or in a body of a packet, the packet containing the communication link performance information identifies a particular socket of the first communication device and includes performance information for the communication link associated with the identified socket.

Once communication link performance information for a socket is stored by the socket API in memory (step 213), the information can be provided to the application having opened the socket or another application requesting the information from the socket API. In particular, the application (or other appropriate application) can send a request for performance data to the socket API in step 221. The request can take the form of an input/output control function call (e.g., a function call to ioctl( )), for example, and can identify as arguments the socket for which information is requested and the type of information being requested. In response to receiving the request, the socket API can retrieve any stored communication link performance information associated with the identified socket and corresponding to the request (step 239), and provide the retrieved performance information to the application (step 241). In step 239, the socket API may provide only the most recent information for the socket stored in memory and corresponding to the request, or it may provide all of the stored information.

The application may use the received performance information to adjust communication or other parameters used by the application (step 243). Future communication packets provided by the application for sending through the socket, or read, write, or other communication requests by the application using the socket, may then be adjusted based on the received information (step 245).

In one example, a video conferencing application can, in response to receiving performance information in step 241, adjust an image resolution parameter or a buffer size parameter for a video conferencing session communicated using a socket, based on the link performance information received for the socket. In the video conferencing example, if the performance information indicates a slow data connection, a parameter may be adjusted to select a lower image resolution; if the performance information indicates an elevated jitter, a buffer for the video may be increased in size/length.

In another example, an application running on the first communication device opens two (or more) different sockets for communication (e.g., using two separate open socket requests in step 201), for example to open a first socket associated with a communication link routed through a Wifi wireless network connection and a second socket associated with a communication link routed through a 3G mobile wireless network connection. The application requests performance data for each of the opened sockets (e.g., by issuing two separate requests in step 221), and receives performance information for each of the sockets. The application can then compare the received performance information in order to select a particular socket, among the opened sockets, to use for a particular communication. For example, the application may select for communication the socket having the performance information indicating a faster and/or more stable communication link through the network. In an alternate example, the communication device may run a speed-booster application configured to monitor the performance information received by the socket API on the communication device, and to control the communication device and/or applications running on the device in order for the device and/or applications to preferentially use connections exhibiting better performance. In the alternate example, the speed-booster application may send performance data requests to the socket API identifying sockets opened by other applications on the device (e.g., in step 221) in order to obtain performance information for those sockets (e.g., in step 241). In turn, the speed-booster application may communicate with the applications or with the socket API in order to cause the applications' socket-based communications to be transmitted through those sockets exhibiting better performance characteristics.

In a further example, an application may issue a select( ) command to the socket API in order to identify a socket having the least latency, highest available bandwidth, or other measure of exhibiting better performance. The select( ) command may identify multiple sockets, and may further identify a particular criteria to use in order to identify the socket having the better performance. In response to receiving the select( ) command, the socket API obtains performance information for each of the identified sockets, compares and evaluates the received performance information in order to identify the socket having the better performance, and generates and transmits back to the application a response message including an identifier for the socket determined to have the better performance.

In the method 200, the communication link performance information provided by the socket API in response to the request for performance data received in step 221 is retrieved from memory. Additionally or alternatively, however, communication link performance information can be actively requested through the communication network in response to the request of step 221. For example, performance information can be actively requested through the communication network in situations in which the memory of the communication device does not store information associated with the socket identified in the request, in situations in which instantaneous (or timely) performance information is needed, as well as in other situations.

Figure 3:
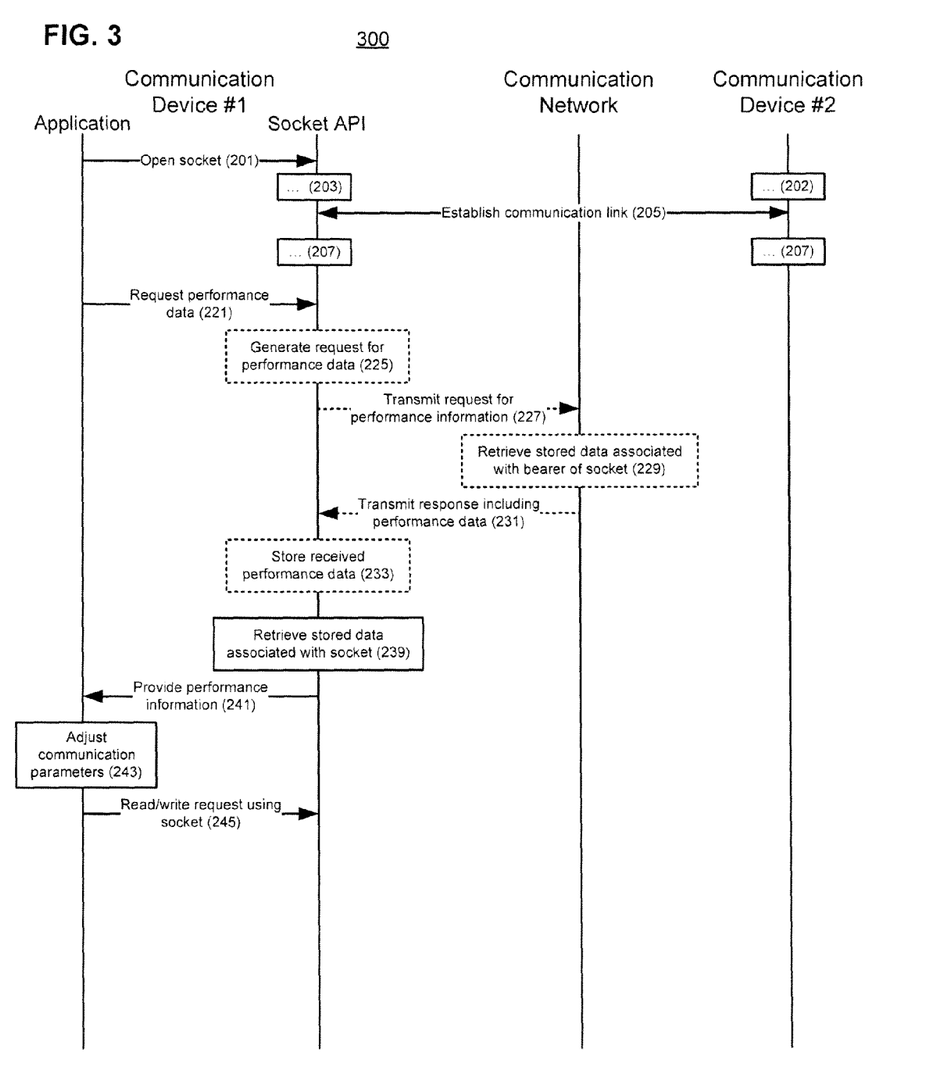

FIG. 3 is a signal flow diagram illustratively showing communications involved in a socket API on a first communication device obtaining and providing information about the performance of a communication link established through a socket with a second communication device. The method 300 includes many steps that are substantially similar to steps previously described in relation to method 200 of FIG. 2, and reference can be made to the earlier description in regards to such steps.

In the method 300, in response to the request for performance data (in step 221) or in response to another appropriate trigger (e.g., a periodic trigger), the socket API generates a request for obtaining performance data for a particular socket from the communication network (step 225). The request generally identifies the first communication device and a particular socket of the first communication device for which performance data is requested. In step 227, the first communication device transmits the request for performance data on the communication network. In general, the request is transmitted to a predetermined network device storing performance information for the communication link associated with the particular socket, such as a performance monitoring network device. In some examples, however, the request is transmitted to a relay device of the communication network that is in-line with the communication link such as a router/switch/gateway, or to the second communication device (i.e., the destination communication device associated with the particular socket). The request is generally transmitted as one or more control packets, such as packets that follow the ICMP protocol. The request can also be transmitted in the header and/or in the body of one or more data packets, such as packets that follow the TCP or UDP protocols.

The request for obtaining performance data is received by a network device, referenced as a performance monitoring network device or network monitor, that can retrieve performance information for the communication link associated with the particular socket identified in the request (step 229). In general, the performance monitor receiving the request is the predetermined network device to which the request was transmitted by the first communication device in step 227. In other examples, notably examples in which the request was not transmitted to a particular predetermined network device, the request is intercepted by a relay device of the communication network that is in-line with the communication link, and forwarded by the relay device to the performance monitor. In some examples, the second communication device functions as the performance monitor, or as the relay device forwarding the request to the performance monitor.

Upon receiving the request, the performance monitor retrieves performance data associated with the socket identified in the request (e.g., socket-specific data) and/or associated with the first communication device having generated and transmitted the request (e.g., bearer-specific information). The performance monitor generates a response message including the retrieved performance data, and transmits the response message across the network back to the first communication device in step 231. The response message may be of a similar type as the request of steps 225 and 227, and can thus take the form of one or more control packets (e.g., ICMP) or data packets (e.g., TCP or UDP). In some examples, the response message is a standalone data packet (with the performance data included in a header and/or body of the data packet), while in other examples the response message is inserted into the header of data packets associated with the particular socket and that are routed through the performance monitor between the second and first communication devices.

Upon receiving the response message, the first communication device retrieves or extracts the communication link performance information from the packet, and stores the received performance data in memory in step 233. The performance data is stored in memory of the first communication device in association with an identifier for the particular socket (and/or the corresponding communication link). The stored performance data can then be used in steps 239-245 as described above in relation to FIG. 2.

Figure 4A:
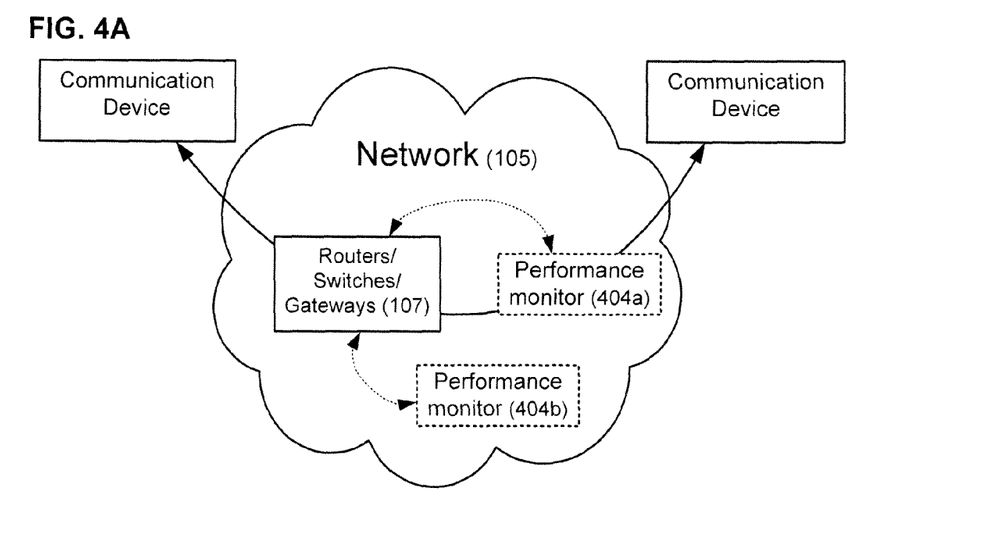
FIGS. 4A and 4B are network diagrams showing possible locations of performance monitors or performance monitoring network devices in networks providing communication links between pairs of communication devices using socket-based communications.
Figure 4B:
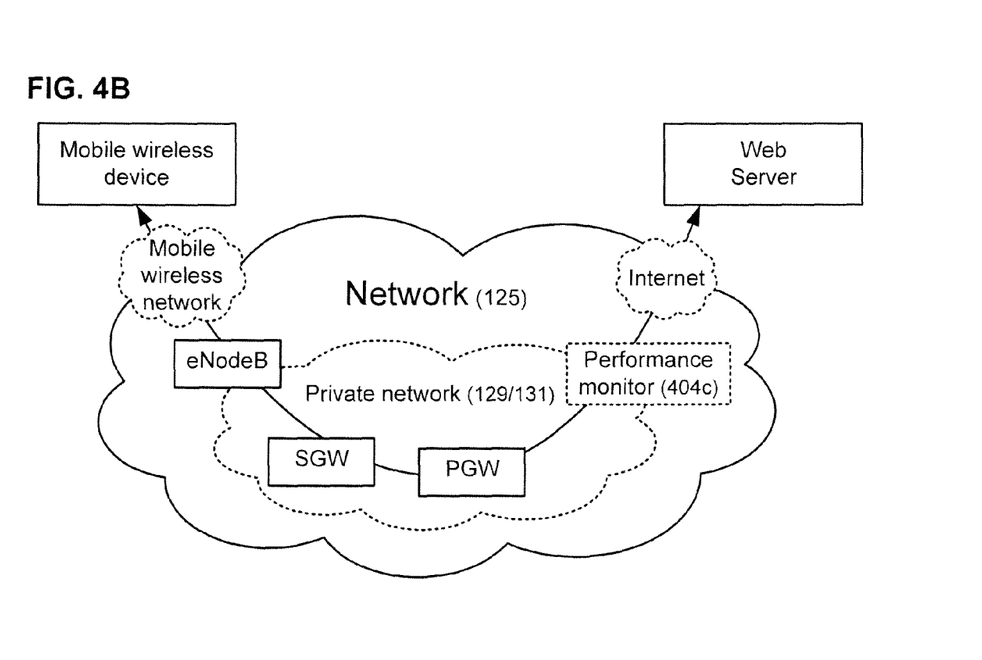

FIGS. 4A and 4B are network diagrams illustratively showing the possible location and connectivity of a performance monitor 404a, 404b, or 404c (referenced generally as performance monitor(s) 404) within a network 105/125.

A performance monitor 404a, or performance monitoring network device, may be located in-line with a communication link between two communication devices, such that packets exchanged by the communication devices through the communication link pass through the performance monitor 404a. The in-line performance monitor 404 is generally implemented as a wire-speed device configured to forward received packets along the communication link with minimal delay. A wire-speed device can forward packets received by the wire-speed device at the line rate (e.g., the rate at which packets can be transmitted along a communication link to which the wire-speed device is coupled). In contrast, non wire-speed devices introduce non-negligible latency in packets between a time at which the packets are received and a time at which the packets are forwarded, resulting in the non wire-speed devices not being able to sustain the line rate. In one example, an illustrative wire-speed device that has line rate capability can process 10 Gbps of traffic in one interface and forward the processed traffic to another interface without dropping any packets. The illustrative wire-speed device may be able to maintain a line rate of 10 Gbps by efficiently reading-in packets, performing functions, modifying the packets, and forwarding the packets in such a way that the ingress rate equals the egress rate. Wire-speed devices can be implemented as ASICs or FPGAs.

An in-line performance monitor 404 generally has a high speed memory (e.g., SRAM, RDL-RAM) to enable the monitor to function at high speed. A performance monitor 404b may more generally be located within the communication network 105 without necessarily being in-line with a communication link between two communication devices. In examples in which the performance monitor 404b is not in-line, the performance monitor can receive and respond to requests for performance information such as the request of steps 225-231.

The performance monitor 404c is represented as an in-line performance monitor located on a communication link between a mobile wireless device and a web server, such as the communication link of FIG. 1B. In the example of FIG. 4B, the performance monitor 404c is located at the interface between private network(s) 129/131, which interconnect an eNodeB, an SGW, and a PGW used in the communication link, and the Internet. By locating the performance monitor 404c at this location, the performance monitor is located in-line with substantially all communication links between mobile wireless devices of a particular operator (e.g., an operator of the eNodeB, the SGW, the PGW, and the private network(s)) and the Internet, enabling the performance monitor to provide performance data for all such communication links involving wireless devices communicating through the operator's network to Internet-connected web servers.

As illustratively shown in FIG. 4A, the performance monitors 404 can be in communication with the routers/switches/gateways 107 of the network 105, and configured to obtain performance data from the routers, switches, and gateways. The functioning of the performance monitors 404 is discussed in more detail below in relation to FIG. 5.

Figure 5:
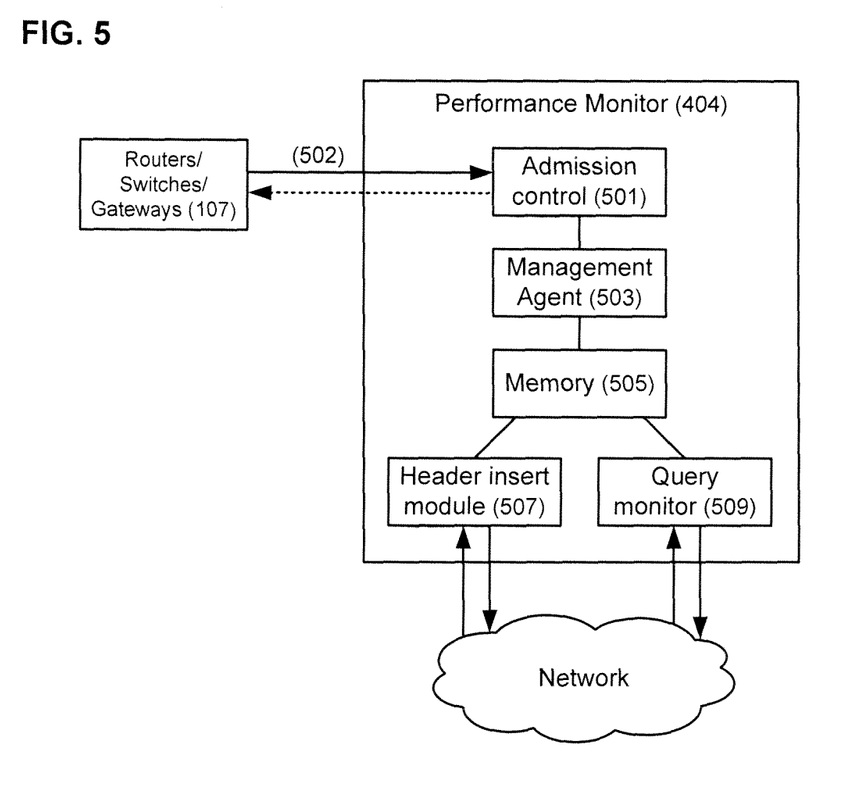
FIG. 5 is a functional block diagram of a performance monitor or performance monitoring network device operative to provide link-performance information to communication devices using socket-based communications.

FIG. 5 is a block diagram showing components of an illustrative performance monitor 404, such as the performance monitors 404a, 404b, 404c shown in FIGS. 4A and 4B. The performance monitor 404 includes a memory 505 for storing performance information for a plurality of sockets, bearers, and communications links. In general, performance information is stored in the memory 505 in association with an identifier for particular socket(s), bearer(s), communication device(s), and/or communication link(s) associated with the information.

The performance data and information stored in memory 505 is obtained by the performance monitor 404 through port 502. An admission control unit 501 of the performance monitor 404 receives performance information through port 502 from routers/switches/gateways 107 of the network, such as eNodeBs 128, SGWs 130, PGWs 132, and from other network elements that may have performance information. The performance information can be received automatically, for example on a periodic basis or upon a router/switch/server detecting a congestion condition or other condition triggering generation and sending of a performance information report. The performance information can alternatively or additionally be received in response to a request sent by the performance monitor 404 to a corresponding router/switch/gateway 107, such as a request transmitted by admission control unit 501 through port 502 and identifying a particular socket, bearer, communication device, or communication link for which performance information is sought.

A management agent 503 processes the performance information received in the admission control unit 501 prior to storage of the information in memory 505. For example, the management agent 503 may receive information obtained from an eNodeB on occupancy and/or delay of a queue in the eNodeB, the queue storing packets associated with a particular socket or bearer. The management agent 503 may store the occupancy and/or delay information, in association with identifier(s) for the corresponding socket(s)/bearer(s)/device(s)/link(s), in the memory 505. The management agent 503 may additionally or alternatively calculate a performance metric based on the occupancy and/or delay information (e.g., queue back log, measured as a percentage), and store the calculated metric, in association with the appropriate identifier(s), in the memory 505. The management agent 503 may further receive from a router/switch/gateway information about a type of wireless connection used by a mobile wireless device to connect to the network, such as identification of a 3G LTE, 4G, Wifi, or other type of wireless connection, and store the information in the memory is associated with identifier(s) for each socket, bearer, device, or link using the identified type of wireless connection. More generally, the management agent 503 may receive information on bandwidth or speed (e.g., measured in kbps), congestion, delay (e.g., round trip delay time in ms), jitter (e.g., in ms), packet loss (e.g., measured as a percentage value), link quality (e.g., measured as a quality of service (Qos) level), or the like, and store the information in the memory 505.

The management agent 503 further manages the information stored in memory 505, for example by deleting outdated performance information or replacing outdated information with updated information, removing entries associated with closed sockets or closed communication links, or the like.

The performance information stored in memory 505 is retrieved by header insert module 507 and/or by query monitor 509. Header insert module 507 is configured to receive a packet transiting through performance monitor 404 (e.g., in examples in which performance monitor 404 is in-line with a communication link), and identify a socket with which the packet is associated by retrieving an identifier for the socket, for a bearer or source and/or destination communication devices, or the like. Based on the identified socket, the header insert module 507 retrieves from memory 505 performance data that is associated with the identified socket, and inserts the retrieved performance data into a portion of the header of the packet (e.g., as in step 210) prior to forwarding the packet along its transmission path. In some examples, the header insert module 507 may additionally determine an amount of space available in the header of the packet (e.g., a number of available bits) to store the performance data, and adjust the type or quantity of performance data to insert into the header based on the available space. The header insert module 507 may also retrieve performance information included in the header of the packet, if any performance information is already included in the header, and provide the retrieved information to the management agent 503 for storage in memory 505 in association with an appropriate socket identifier.

In some examples, the header insert module 507 inserts performance information into the header of each packet associated with a socket for which memory 505 stores performance data. In other examples, however, the performance information is only inserted into some packets associated with sockets for which memory 505 stores performance data. In one instance, performance information is only inserted into packets destined for communication devices running socket APIs that are capable of providing link-performance information to applications running on the devices, or performance information is not inserted into packets destined for communication devices running socket APIs that are known not to be capable of processing link-performance information. In another instance, performance information is only inserted into packets when new performance data is available, where the new performance data is performance data which has not previously been inserted in a packet associated with a particular socket (or particular destination communication device). In another instance, performance information is only inserted into packets that are associated with particular sockets, where the particular sockets may be sockets for which performance data has been requested to be inserted. In another instance, performance information may be provided in only a certain percentage of packets associated with a particular socket, for example such that 25% of packets (e.g., every fourth packet) associated with a particular socket includes the performance information. The percentage may be adjusted on a socket-by-socket basis, such that different sockets may have a higher or lower ratio of packets including performance information.

Query monitor 509 is configured to receive requests for performance information (e.g., as in step 227) transmitted by a communication device, and to identify a socket with which the request is associated by retrieving an identifier for the socket, for a bearer or source and/or destination communication devices, or the like from the received request. Based on the identified socket, the query monitor 509 retrieves from memory 505 performance data that is associated with the identified socket (e.g., as in step 229), and generates and transmits a response message including the retrieved performance data (e.g., as in step 231) back to the sender of the request or to another destination device identified in the request. In general, the query monitor 509 provides performance information only in response to receiving requests for performance information, and transmits response messages including performance data back to the sender of the request. In some examples, however, the query monitor 509 may automatically send a periodic message including performance data to a particular communication device (e.g., a communication device having requested to receive automatic periodic performance information updates), automatically send a message including the performance data upon new performance data being received for a particular socket (e.g., by sending automatic performance information updates to a communication device having requested such automatic updates), or the like.

Both the header insert module 507 and query monitor 509 may select the performance information to provide in a header or response message. In one example, only the most recent performance information is provided. In another example, only performance information that was received by the performance monitor within a specified period of time (e.g., within the last 500 ms period) is provided. Furthermore, in some situations, the header insert module 507 and query monitor 509 may encounter restrictions on the amount of performance data that can be sent in a single header or response message (e.g., a restriction on the length of a field in the header, or on the length of a response message). In such situations, the header insert module 507 and query monitor 509 may distribute the performance data over multiple packets, such that only a portion of the information is provided in each packet.

While the performance monitor 404 of FIG. 5 is shown as including both a header insert module 507 and a query monitor 509, in some examples the query monitor will include only one (and not both) of the header insert module 507 and the query monitor 509.

As shown by the above discussion, functions relating to the providing of performance information regarding a communication link in a socket-based communication device may be implemented on communication or network devices (or other programmable equipment, such as computers or the like) connected for data communication via the components of a packet data network, operating as communication devices and/or performance monitors as shown in FIGS. 1A, 1B, 4A, and 4B. Although special purpose devices may be used, such devices also may be implemented using one or more hardware platforms intended to represent a general class of data processing device commonly used to run "client" or "server" programming so as to implement the functions discussed above, albeit with an appropriate network connection for data communication.

As known in the data processing and communications arts, a general-purpose communication or network device typically comprises a central processor or other processing device, an internal communication bus, various types of memory or storage media (RAM, ROM, EEPROM, cache memory, disk drives etc.) for code and data storage, and one or more network interfaces (e.g., cards or ports) for communication purposes. The software functionalities involve programming, including executable code as well as associated stored data, e.g. files used for the providing of performance information. The software code is executable by the device that functions as a communication device and/or that functions as a performance monitor. In operation, the code is stored within the communication or network device platform. At other times, however, the software may be stored at other locations and/or transported for loading into the appropriate device. Execution of such code by a processor of the device platform enables the platform to implement the methodology for a socket API or other application running on a communication device, or the methodology for the performance monitor, in essentially the manner performed in the implementations discussed and illustrated herein.

Figures 6, 7:
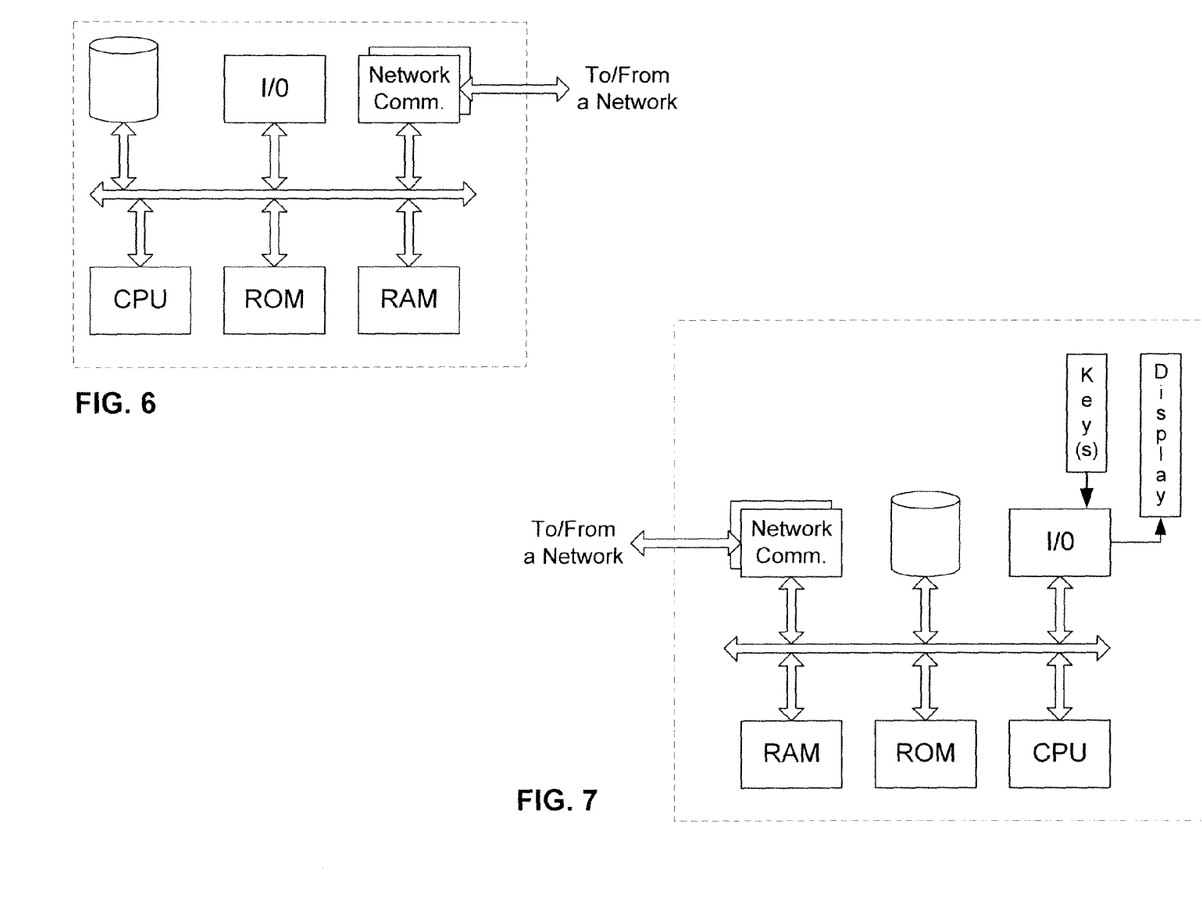
FIG. 6 is a simplified functional block diagram of a computer that may be configured as a host or server, for example, to function as a web server or a performance monitor in the systems of FIGS. 1A, 1B, 4A, and 4B.
FIG. 7 is a simplified functional block diagram of a user-equipment type of communication device such as a computer, work station, or mobile wireless device.

FIGS. 6 and 7 provide functional block diagram illustrations of general purpose communication or network device hardware platforms. FIG. 6 illustrates a network or host computer platform, as may typically be used to implement a server-type of communication device or network device. FIG. 7 depicts a computer with user interface elements, as may be used to implement a user-equipment type of communication device or other type of computer, work station, or mobile wireless device, although the computer of FIG. 7 may also act as a server if appropriately programmed.

A server, for example, includes a network communication interface for packet data communication across a wired and/or wireless network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load.

Hence, aspects of the methods for providing performance information regarding a communication link in a socket-based communication device outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of a communication device or a performance monitor.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the communication devices and/or performance monitors shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
    in response to receiving a request to establish a connection through a socket from an application running on a communication device running a network socket application programming interface (API), establishing a communication link with another communication device for use in communicating packets associated with the socket to or from the other communication device across a communication network;
    receiving, in the network socket API across the established communication link, a packet associated with the socket and including information about a performance of the communication link;
    storing, by the network socket API in a memory of the communication device, the received information about the performance of the communication link; and
    in response to receiving a request from the application running on the communication device for information about the performance of the communication link, retrieving by the network socket API and returning to the application the stored information about the performance of the communication link.

2. The method of claim 1, wherein the received information about the performance of the communication link is stored by the network socket API in association with an identifier for the socket.

3. The method of claim 1, wherein the request received from the application running on the communication device is an input/output control function call (ioctl( )).

4. The method of claim 1, wherein:
    the received packet associated with the socket is a data packet having a header,
    the header of the packet includes the information about the performance of the communication link, and
    the body of the packet includes data destined for the application running on the communication device.

5. The method of claim 4, wherein:
the received packet is a TCP or a UDP packet, and
the information about the performance of the communication link is included in an options field of the header of the packet.

6. The method of claim 1, wherein the packet is a control packet following an Internet control message protocol (ICMP).

7. The method of claim 1, further comprising:
in response to receiving the request from the application running on the communication device for information about the performance of the communication link, generating and transmitting across the network a control packet requesting the information about the performance of the communication link,
wherein the received packet associated with the socket is received in response to the control packet requesting the information.

8. The method of claim 1, wherein the information about the performance of the communication link includes information about a type of wireless connection over which the communication link is established, information about network bandwidth or network speed, network congestion and back-log, jitter, delay, packet loss, or link quality on the established communication link.

9. The method of claim 1, wherein the communication device is a user equipment device or a server configured to use sockets for communication across a communication network.

10. The method of claim 1, further comprising:
receiving, in the network socket API, a second request from the application running on the communication device for information about a performance of a communication link associated with a second socket;
in response to receiving the second request, retrieving by the network socket API and returning to the application information about the performance of the communication link associated with the second socket; and
receiving a communication request from the application through a selected one of the first and second sockets, wherein the one of the first and second sockets is selected based on the returned information about performance of each of the communication links associated with the first and second sockets.

11. A communication device comprising:
a network communication interface;
a processor; and
a memory storing computer readable instructions wherein execution of the computer readable instructions by the processor configures the communication device to perform the method according to claim 1.

12. An article of manufacture, comprising:
a non-transitory computer-readable medium; and
computer-executable instructions embodied in the medium wherein execution of the computer-executable instructions by a processor of the communication device cause the communication device to perform the method according to claim 1.

13. A method comprising:
obtaining, by a network device connected to a network, performance information about a performance of at least one communication link used by at least one communication device for socket-based communication through the network, the performance information representing performance measured by a performance monitor connected to the network;
storing, in a memory of the network device, the obtained performance information; and
in response to receiving a packet that is associated with a socket of a communication device;
retrieving, from the memory, performance information about a performance of a communication link associated with the socket;
inserting, by the network device, the retrieved performance information into a header of the received packet; and
forwarding the packet including the inserted performance information to the packet's destination.

14. The method of claim 13, wherein the header of the received packet does not include the performance information about the performance of the communication link associated with the socket when the packet is received.

15. The method of claim 13, wherein:
the received packet is a packet transmitted by a user-equipment type of communication device; and
the packet's destination is a user-equipment type of communication device.

16. The method of claim 13, further comprising:
receiving, in the network device, information about the performance of a particular communication link from a network relay device located along the particular communication link in the network,
wherein:
the network relay device is one of an eNodeB device, a SGW, or a PGW, and
the information received from the network relay device is inserted into the header of the received packet.

17. The method of claim 13, wherein:
the network device is a wire-speed device that is located in-line with at least one of the communication links, and
the obtaining comprises obtaining measured performance information about the performance of the at least one communication link passing through the wire-speed network device.

18. A network device comprising:
a network communication interface;
a processor; and
a memory storing computer readable instructions wherein execution of the computer readable instructions by the processor configures the network device to perform the method according to claim 13.

19. An article of manufacture, comprising:
a non-transitory computer-readable medium; and
computer-executable instructions embodied in the medium wherein execution of the computer-executable instructions by a processor of the network device cause the network device to perform the method according to claim 13.

20. A method comprising:
obtaining, by a network device connected to a network, performance information about a performance of at least one communication link used by at least one communication device for socket-based communication through the network, the performance information representing performance measured by a performance monitor connected to the network;
storing, in a high speed memory of the network device, the obtained performance information; and
in response to receiving from one communication device a control packet requesting performance information about a performance of a communication link associated with a particular socket:
retrieving, from the memory, the requested performance information about the performance of the communication link associated with the particular socket;

generating, by the network device, a response control packet including the requested performance information; and transmitting the generated response control packet to the one communication device.

21. The method of claim 20, further comprising:

receiving, in the network device, information about the performance of a particular communication link from a network relay device located along the particular communication link in the network, wherein:

the network relay device is one of an eNodeB device, a SGW, or a PGW, and the information received from the network relay device is included in the response control packet generated by the network device.

22. The method of claim 21, wherein:

the network device is a wire-speed device that is located in-line with at least one of the communication links, and the obtaining comprises obtaining measured performance information about the performance of the at least one link passing through the wire-speed network device.

23. The method of claim 21, wherein the stored performance information is socket-specific information about the performance of the particular communication link.

24. A network device comprising:

a network communication interface;

a processor; and a memory storing computer readable instructions wherein execution of the computer readable instructions by the processor configures the network device to perform the method according to claim 20.

25. An article of manufacture, comprising:

a non-transitory computer-readable medium; and computer-executable instructions embodied in the medium wherein execution of the computer-executable instructions by a processor of the network device cause the network device to perform the method according to claim 20.

* * * * *